United States Patent
Buer

(10) Patent No.: US 7,006,791 B2
(45) Date of Patent: Feb. 28, 2006

(54) SYSTEM AND METHOD FOR UPLINK POWER CONTROL BY DETECTING AMPLIFIER COMPRESSION POINT USING DC CURRENT DETECTION

(75) Inventor: Kenneth V. Buer, Gilbert, AZ (US)

(73) Assignee: U.S. Monolithics, L.L.C., Chandler, AZ (US)

( * ) Notice: Subject to any disclaimer, the term of this patent is extended or adjusted under 35 U.S.C. 154(b) by 680 days.

(21) Appl. No.: 09/810,995

(22) Filed: Mar. 16, 2001

(65) Prior Publication Data

US 2002/0132580 A1 Sep. 19, 2002

(51) Int. Cl.
*H04B 1/00* (2006.01)

(52) U.S. Cl. .................. 455/13.4; 455/127.2; 455/430; 370/318

(58) Field of Classification Search .............. 455/127.1, 455/127.2, 126, 13.4, 522, 430; 370/318
See application file for complete search history.

(56) References Cited

U.S. PATENT DOCUMENTS

| | | | |
|---|---|---|---|
| 4,038,600 A | 7/1977 | Thomas | |
| 4,578,633 A | 3/1986 | Aoki | |
| 4,752,967 A | 6/1988 | Bustamante et al. | |
| 5,426,395 A | 6/1995 | Cygan | |
| 5,940,025 A | 8/1999 | Koehnke | |
| 6,035,008 A | 3/2000 | Kim | |
| 6,256,483 B1 * | 7/2001 | Moerder et al. | 455/115.1 |
| 6,298,244 B1 | 10/2001 | Boesch et al. | |
| 6,353,360 B1 | 3/2002 | Hau et al. | |
| 6,587,002 B1 * | 7/2003 | Vogt | 330/298 |
| 6,662,018 B1 * | 12/2003 | Kintis et al. | 455/522 |

FOREIGN PATENT DOCUMENTS

| | | |
|---|---|---|
| JP | 04351021 A | 12/1992 |
| JP | 2000295048 A | 10/2000 |
| WO | WO 99/21291 A1 | 4/1999 |

\* cited by examiner

*Primary Examiner*—Nick Corsaro
(74) *Attorney, Agent, or Firm*—Snell & Wilmer L.L.P.

(57) ABSTRACT

An uplink power control system and method of the present invention includes a current sensing technique for predicting the P1 db power compression point. A dc current sensor detects the level of dc current transmitted from a control unit to an antenna unit of the system. The current measurements are analyzed to generate a theoretical prediction of amplifier linearity as the power levels are increased. The change in dc current indicates an inflection point where the amplifier no longer behaves linearly to an increase in RF power. Using this inflection point, an accurate assessment of the P1 db compression point of the system can be determined and the signal power levels adjusted accordingly.

16 Claims, 5 Drawing Sheets

Figure 2: Prior Art

SYSTEM AND METHOD FOR UPLINK POWER CONTROL BY DETECTING AMPLIFIER COMPRESSION POINT USING DC CURRENT DETECTION

FIELD OF INVENTION

The present invention relates generally to a system and method for power control in a communication system and, particularly to uplink power control and detection.

BACKGROUND OF THE INVENTION

Communication systems, such as satellite communication systems, typically include one or more control loops for power transmission. FIG. 1 illustrates, in block format, a typical power detect and control scheme for a satellite communication system. System 100 includes an indoor unit (IDU) 102 which provides signals to an outdoor unit (ODU) 104 over a cable 103. Generally, IDU 102 is configured to control the level of the RF (radio frequency) signal to be transmitted to a satellite. For example, by increasing or decreasing the signals provided to ODU 104, IDU 102 can vary the output power of the RF signal transmitted to the satellite.

Collectively, IDU 102, ODU 104, and cable 103 are generally termed "ground station". The ground station may be located on, for example, a stationary structure (e.g., building) or a moving structure (e.g., vehicle) such that communication with the satellite is permissible. In many applications, the IDU is located near or within a computer, e.g., a card that fits inside the computer processor or a box in proximity to the computer. The cable or multiple cables interconnect the IDU with the ODU, which may be located outside, e.g., on the roof of a building or a vehicle. Another ground station, generally illustrated in FIG. 1 as a dish antenna, provides similar functionality for the opposite end of the communication link in order to connect the user of ground station 100 to a telecommunications or computer network.

As is often the case in wireless transmission, obstructions, e.g., clouds, rain, structures, and the like, can decrease the transmission reception of the RF signal received at the satellite, i.e., the signal-to-noise (SNR) of the RF signal decreases. The satellite may transmit a signal back to the ground station indicating that the RF signal received at the satellite is too weak, for example, the strength (i.e., power level) of the received signal is too low for optimum detection. In response, the ground station typically has two options; reduce the data bit rate (which is generally undesirable) by either a method of bandwidth reduction or increased error correction coding, or increase the RF signal strength. To increase the RF signal strength, the IDU increases the signal power to the ODU, thereby increasing the RF signal strength transmitted to the satellite.

ODU 104 includes a power amplifier (not shown) to increase or boost the RF signal in preparation for transmission to the satellite. Power amplifiers are often characterized by the maximum power capability of the device. For instance, as increasing RF power is supplied to an amplification device, the output power of the device increases accordingly, until a "saturation level" of the device is reached. At saturation, or the maximum RF power capability, the amplifier output no longer behaves linearly to an increase in power, regardless of the amount of input power. When in saturation the RF waveform is "clipped" and the maximum amount of energy is contained in the primary signal. As the input power is further increased, the excess signal energy creates additional signal distortion and signal harmonics.

Signal harmonics can mix together to form a spectrum image of the primary signal in an adjacent communication channel. The adjacent channel interference caused by the power amplifier distortion begins to decrease the SNR of the signals from other users in adjacent transmission channels. To compensate for the lower SNR, the IDU of those users, operating in adjacent channels, typically increases the power to the ODU. Increasing the power continues to increase the harmonics and in turn decrease the SNR; thus the cycle continues. In addition to causing disruptive interference, governing regulatory bodies such as the FCC generally place limits on the levels of acceptable adjacent channel interference levels.

To reduce the interference caused by harmonics, it is desirable to control the level of power supplied to the ODU. When the input signal is amplified by about 1 db (decibel) less than the small signal gain, it is commonly called the 1 db compression point (P1 db). As the input signal to the amplifier is increased past P1 db, the output signal is no longer in a linear relationship with the input signal and a rapid decrease in gain is experienced; thereby causing signal harmonics. It is desirable to detect and limit the amount of power to a component, such as a power amplifier, to approximately P1 db of the component to avoid creating signal harmonics which can adversely affect signal transmission.

Referring to FIG. 2, a ground station 200 of a prior art uplink power detect and control system is illustrated. Ground station 200 includes an IDU 202, an ODU 204, and signal transfer means 203. Signal transfer means 203 includes, for example, one or more cables suitable for signal transmission between IDU 202 and ODU 204, e.g., industry standard RG-6 type cable (coax) such as Belden 9114.

Generally, IDU 202 includes a modem 210 to receive and transmit IF (intermediate frequency) signals to ODU 204 and a DC (direct current) power supply 212 to transmit DC power to ODU 204. A typical modem 210 has a demodulator 214, a modulator 216, an automatic gain control 218, and an automatic level control 220. Demodulator 214 converts the received IF signals into digital data which can be coupled to a computer or other digital appliance via a serial or parallel digital interface. Automatic gain control 218 is used to adjust the input IF signal level up or down to provide an approximately constant signal level to demodulator 214. Modulator 216 converts digital data from the serial or parallel digital interface to an IF signal. Automatic level control 220 is used to increase or decrease the output signal level provided to the ODU based on link conditions (e.g., weather, temperature, interference, etc.).

Generally, ODU 204 includes a receiver 222, an antenna 224, a transmitter and power amplifier 226, an RF power detector 228, and interface circuitry 230. The receiver 222 comprises a low noise amplifier to amplify the input RF signal from the antenna and a down conversion mixer to convert the RF signal to an IF signal. Additionally, receiver 222 may contain one or more RF, IF or local oscillator (LO) amplifiers as well. Antenna 224 may be any antenna suitable for receiving and transmitting the proper frequencies; such as a dish, dipole, phased array, or any other suitable antenna. Transmitter 226 receives the IF signal from IDU 202. A signal mixer (not shown) within transmitter 226 generates an RF signal from the received IF and DC signals. Transmitter 226 also comprises a power amplifier, e.g., a high power amplifier (HPA), which boosts the RF signal in preparation for transmission to the satellite.

Inclusion of RF power detector 228 is one prior art technique for detecting and limiting the power to transmitter 226 by means of the automatic level control 220 for reducing the effects of signal interference. RF power detector 228 (also called a "forward power detector") generally includes a coupler, detector diode, comparator, and signal transmission means (e.g., interface circuitry 230) for transmitting signals back to IDU 202.

In operation, RF power detector 228 samples the output signal from the power amplifier (prior to antenna transmission) and sends the signal back to the IDU. Interface circuitry 230 is required in order to use automatic level control 220. An additional signal transfer means 203, e.g., an additional cable or multiplexing circuitry, is required to transmit the output RF signal from ODU 204 to IDU 202 (generally illustrated in FIG. 2 as "Forward Power Telemetry"). Using the sampled power output at the ODU, the IDU can gauge how much more power station 200 can transmit without causing the amplifier to go into compression.

There are significant disadvantages to the forward power detector system of the prior art. For example, each of the components in the forward power detector system, e.g., diode, coupler, op amp, operate differently under environmental variations, in particular to temperature changes. To accommodate for the variations, each system using a forward power detector unit must be calibrated individually under various conditions. This data must then be stored in an accessible database for each unit for subsequent reference. Such data collection is labor intensive, requires memory storage, and is susceptible to erroneous calculations.

Also, the forward power detector system of the prior art draws power from the output of the power amplifier. Any power loss at the output of the amplifier must be compensated for by increasing the overall output of the amplifier. This is not always trivial. In fact, the cost of the power amplifier unit is often dependent upon the power output capabilities of the unit. Therefore, as more output power is required to account for loss, a more expensive power amplifier is generally needed.

In addition, interfacing the signals from the forward power detector system to the IDU can require additional cables or multiplexing circuitry, complex interface components and circuitry, or a combination of both.

Another technique for detecting power levels includes detecting the input power to a FET-based amplifier by gate current sensing. As RF power is increased to the amplifier, the gate-source junction of the FET mimics the behavior of a schottky diode. The input RF signal becomes rectified, resulting in a net DC current into the device. A relationship between the input power level and the gate current can then be established through careful monitoring of the gate-source junction.

While the gate current sensing technique overcomes some of the problems associated with the forward power detector system, e.g., eliminates the hardware at the power amplifier output and reduces system loss, disadvantages to the gate current sensing technique are readily identified. Due to system variations that are inherent to the component and the environment of the unit, this technique is extremely susceptible to error. For example, gate current sensing measures the input drive power to the amplifier, not the output power which is the relevant measurement. While it is feasible to determine the output power mathematically from the input power and the gain, this calculation can vary substantially due to gain variations caused by environmental changes, unit variations, and the like. Therefore, as the gain of the amplifier changes, the calculated output power will change.

Moreover, the diode characteristics of the FET amplifier vary from device to device; thereby increasing the risk of erroneous readings. Under high RF input drive, the normally reverse biased gate-drain junction can begin to breakdown and cause a net current flow out of the gate. Accurate gate current readings may be difficult due to some or all of the current flow into the gate being cancelled.

Accordingly, an improved system and method for power control in a communication system is needed. In particular, a power control and detection system, that is substantially independent from environmental variations, for providing improved detection accuracy without substantially increasing cost, components, and system interconnect requirements is needed.

SUMMARY OF THE INVENTION

According to various aspects of the present invention, a ground station system includes a signal control unit configured to modulate a transmission signal to a satellite at or below the P1 db point to avoid excessive adjacent channel interference. The P1 db point is determined in accordance with a dc current sensing means.

In accordance with a method of the present invention, a signal control system transmits a signal for transmission from a control unit to a transceiver unit. The control unit detects the DC current being drawn by the transceiver during transmission and determines a desired maximum signal power level of the signal based upon the detected DC current levels. The signal is kept at or below the desired maximum signal power level and transmitted from the transceiver unit.

BRIEF DESCRIPTION OF THE DRAWINGS

These and other features, aspects and advantages of the present invention will become better understood with reference to the following description, appending claims, and accompanying drawings where:

DETAILED DESCRIPTION OF EXEMPLARY EMBODIMENTS

The present invention relates to a system and method for power control in a communication system. The power control system according to various aspects of the present invention requires minimum hardware to implement with no additional telemetry interface. In addition, the power control system of the present invention provides control of the output power that is substantially independent from environmental variations. The power control system in accordance to various embodiments of the invention provides an accurate and reliable method for controlling the output power of, for example, a power amplifier. In particular, the input current to the amplifier is suitably detected and utilized to determine the P1 db point of the amplifier. The input power can then be controlled to remain at or below the P1 db point.

Figure 1:
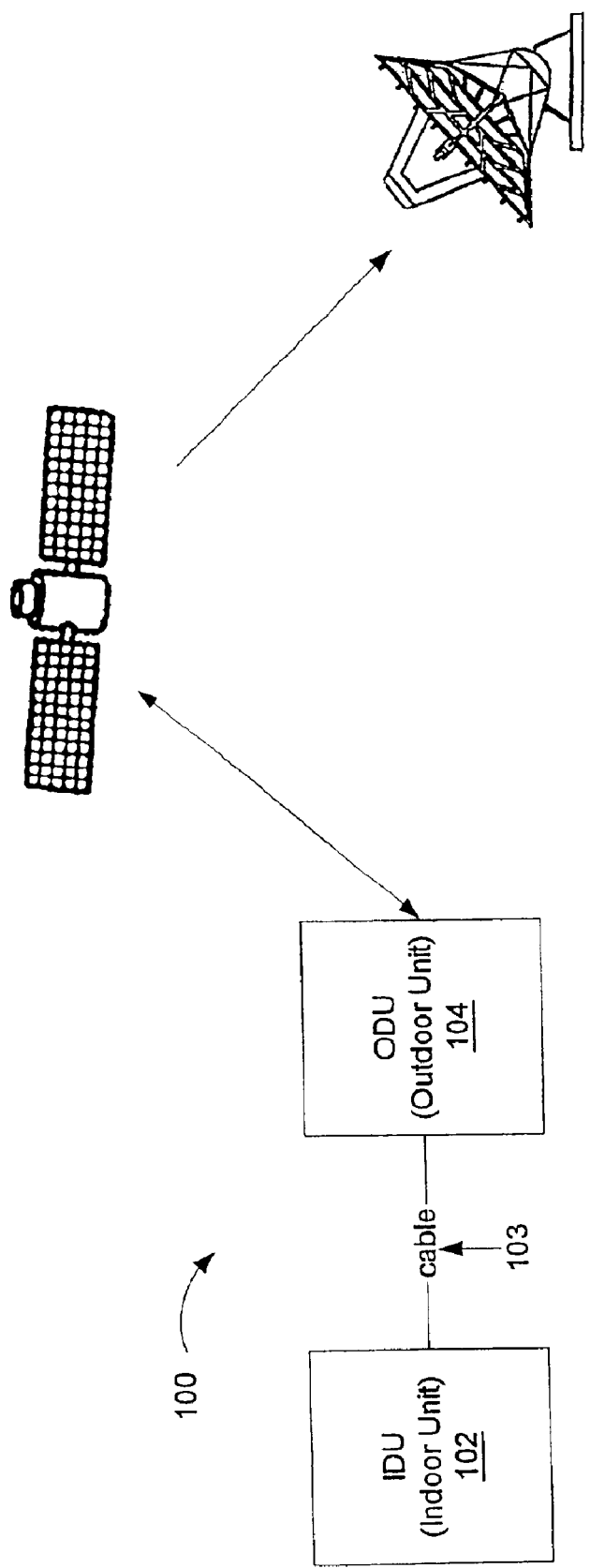
FIG. 1 illustrates, in block format, a typical power control scheme for a satellite communication system.
Figure 2:
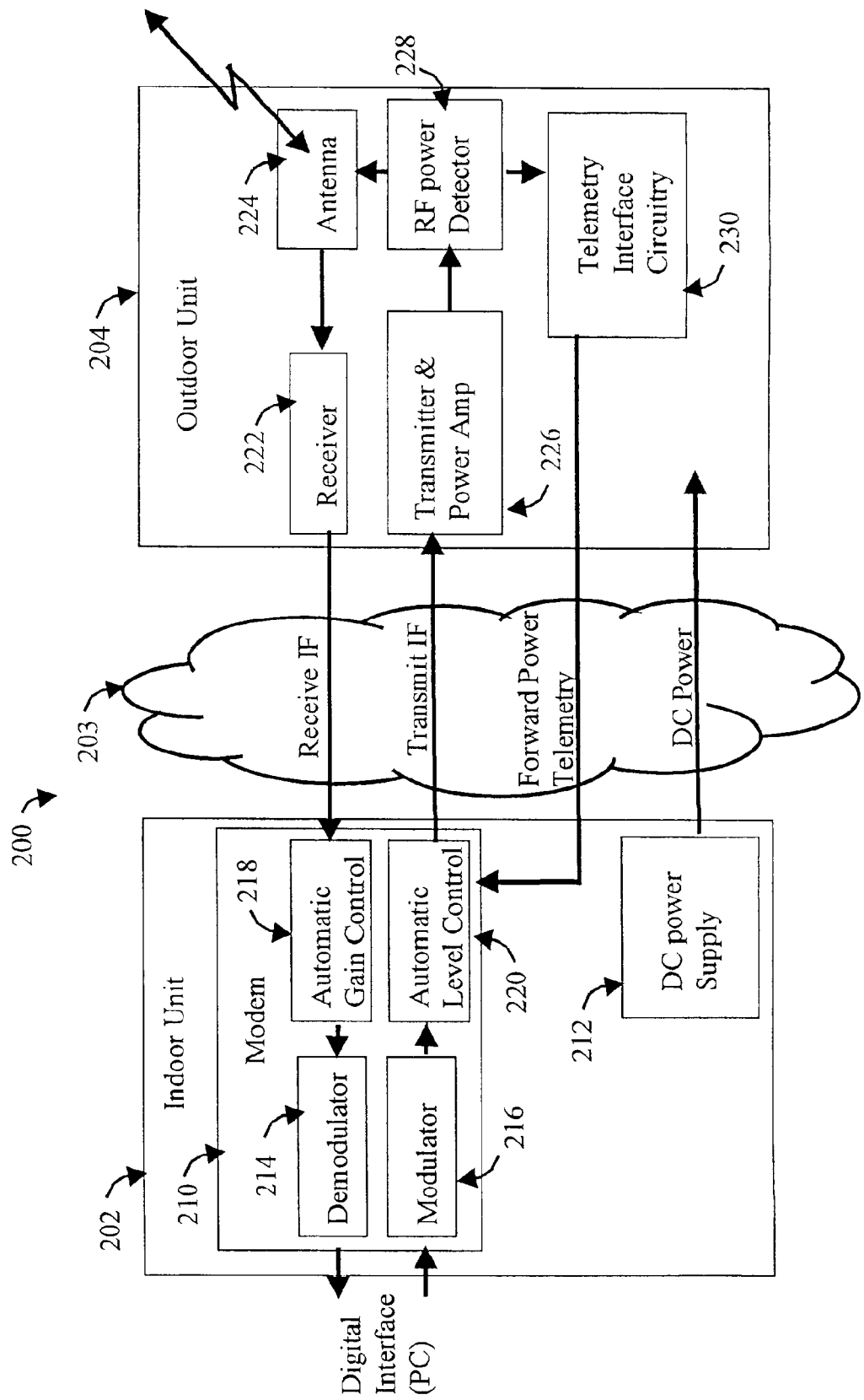
FIG. 2 illustrates, in block format, a ground station for uplink power control of the prior art.
Figure 3:
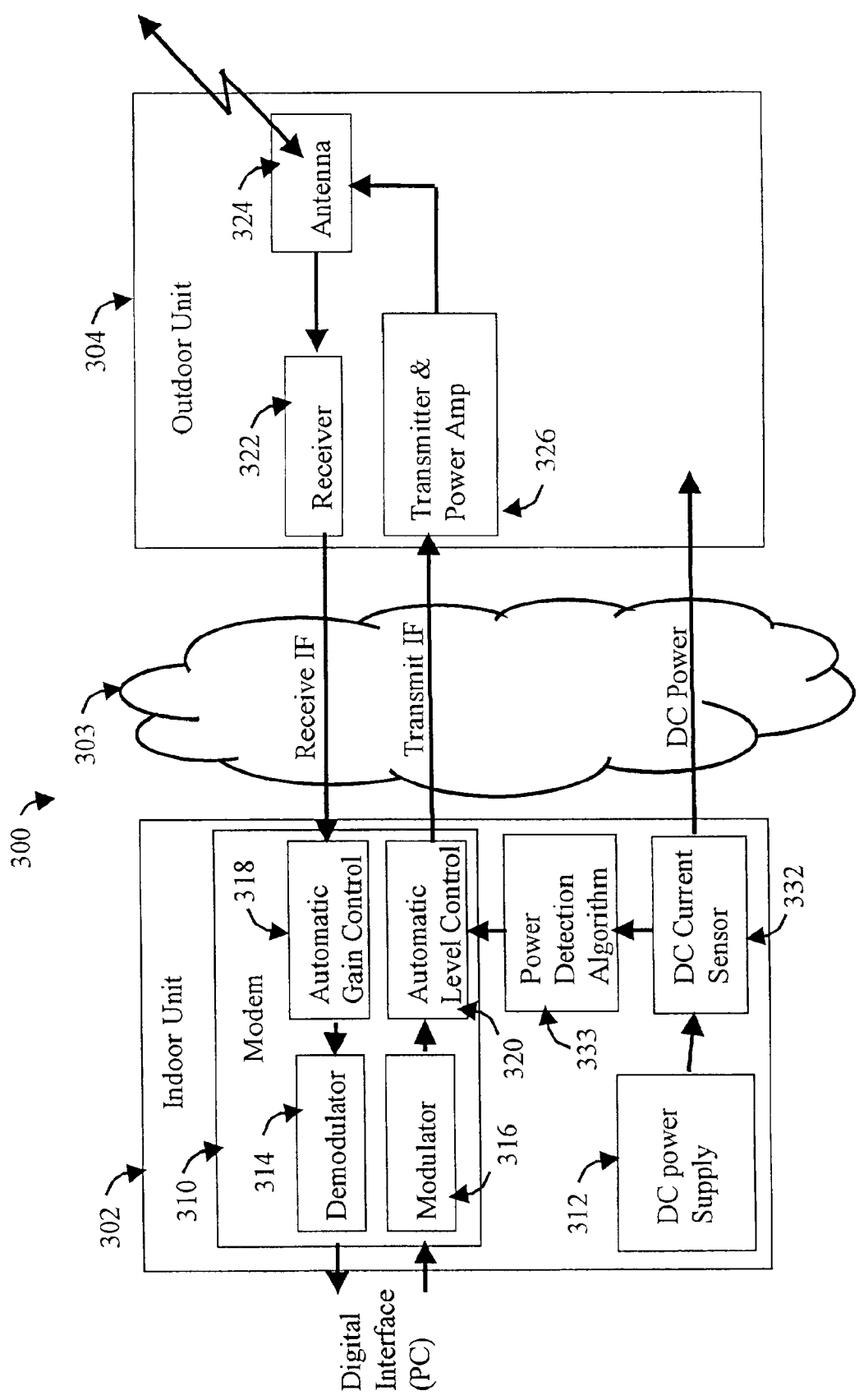
FIG. 3 illustrates, in block format, a ground station for uplink power control in accordance with the present invention.

FIG. 3 illustrates, in block format, an exemplary ground station system 300 for uplink power control in accordance with the present invention. System 300 includes an indoor unit (IDU) 302, an outdoor unit (ODU) 304, and signal transfer means 303. Signal transfer means 303 includes, for example, a cable suitable for two-way signal transfer between IDU 302 and ODU 304, e.g., a cable similar to the cable described for signal transfer means 203. However, unlike signal transfer means 203 of the prior art, which generally requires a separate cable for forward power telemetry transfer, signal transfer means 303 does not require a transfer means for forward power telemetry. Therefore, signal transfer between the IDU and ODU of the present invention can be accomplished using a single cable or coax.

Similar to ODU 204 of the prior art, ODU 304 of the present invention includes a receiver 322, an antenna 324, and a transmitter and power amplifier 326. Elements 322 through 326 perform substantially the same functions and may include the same or equivalent components as elements 222 through 226 of prior art ODU 204. Thus, these elements and their functions are well known in the industry and will not be described in detail herein, nor will their functions be repeated.

It should be noted, however, that ODU 304 of the present invention does not include a forward power detection system (e.g., RF power detector 228 and interface circuitry 230) of the prior art ODU 204. Eliminating the power detection system at the output of the power amplifier, permits the RF signal to be delivered to antenna 324 with very little power loss (i.e., no power is being drawn from the output to a detection system thereby increasing the power loss). In fact under normal conditions, the power loss associated with the transfer of the RF signal from power amplifier 326 to antenna 324 is loss inherent in any signal routing circuitry and is generally insignificant over short lengths.

Moreover, removing the power detection system at the ODU abolishes the need to transmit the telemetry signal back to the IDU for analysis. Thus, the forward power telemetry and complex interface circuitry that is generally required in the ODU of the prior art is not needed in the ODU of the present invention. As a result, the cabling requirement between the IDU and ODU is reduced, and in many cases, a single cable is capable of handling all the signal transmissions.

IDU 302 includes a modem 310 to receive and transmit IF signals to ODU 304 and a DC power supply 312 to transmit DC power to ODU 304. Similar to modem 210, modem 310 includes a demodulator 314, a modulator 316, an automatic gain control 318, and an automatic level control 320. Elements 314 through 320 perform substantially the same functions and may include the same or equivalent components as elements 214–220 of prior art modem 210. Thus, these elements and their functions are well known in the industry; therefore, they will not be described in detail herein, nor will their functions be repeated.

IDU 302, in accordance with various aspects of the present invention, includes a current sensor 332 (e.g., an ammeter). The physical and functional characteristics of current sensor 332 are well known in the industry and will not be discussed in great detail herein. Current sensor or ammeter 332 measures the DC current, for example, flowing through two terminals of the device, from DC power supply 312.

Preferably, IDU 302 further includes a processing and memory means for processing, among other things, the DC current measurements, and storing the measurements for subsequent use. As will be discussed in further detail below, the present invention utilizes past and present DC current measurements to determine a current inflection point of the power amplifier located in ODU 304.

As previously discussed, it is desirable to detect and limit the amount of RF power into an amplification device, such as power amplifier 326, in order to keep the power amplifier in an approximately linear operation thus reducing the effects of adjacent channel signal interference. The P1 db point, or at the point where the input signal is amplified by an amount approximately 1 db less than the linear gain level, is a reasonable limitation to place on the power control system. In other words, controlling the amplifier such that a limitation is placed on the system not to broadcast higher than the P1 db point minimizes the risk of generating signal harmonics and adjacent channel signal interference.

Figure 4:
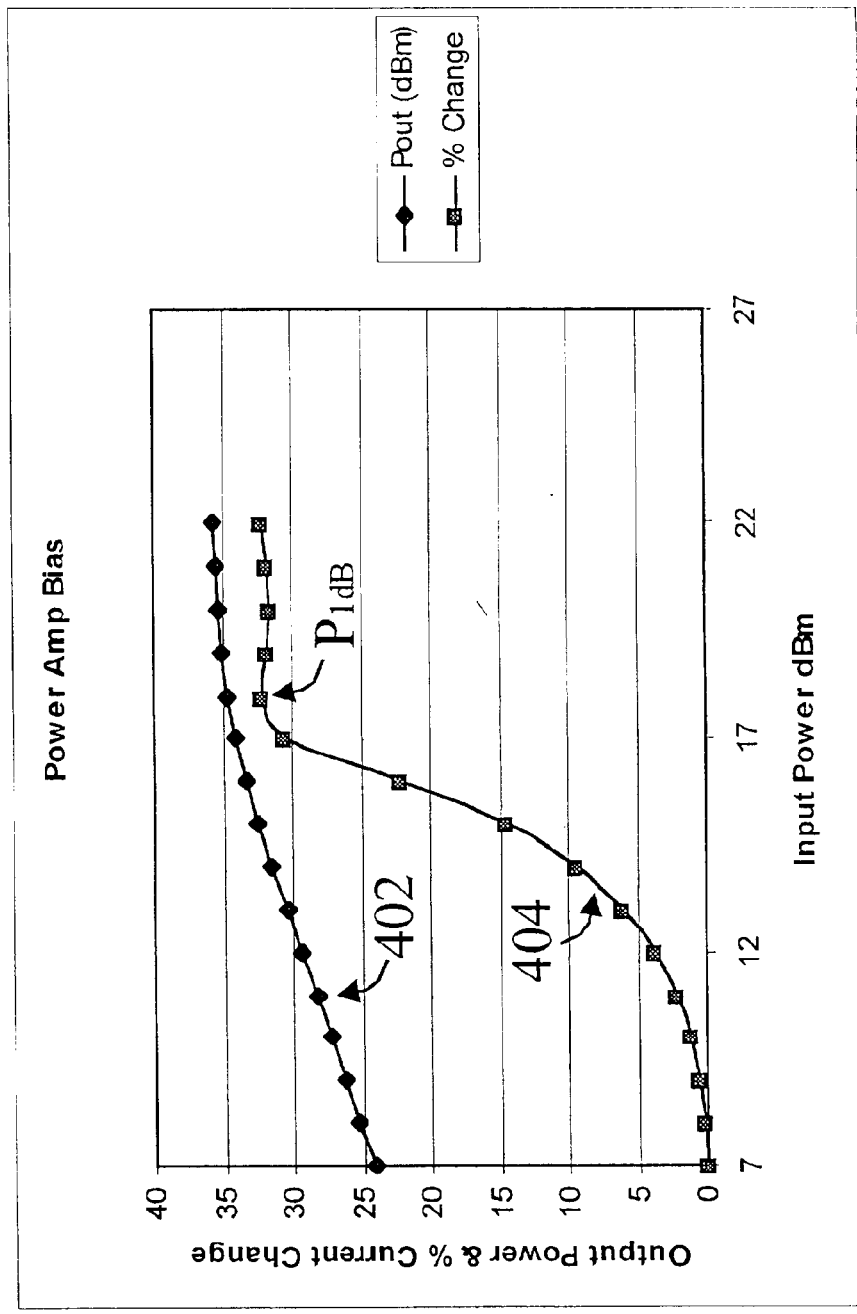
FIG. 4 is a graphical representation of the P1 db point in accordance with a power control system of the present invention.

Referring now to FIG. 4, a graphical representation of the power compression point or P1 db point in accordance with a power control system of the present invention is illustrated. Curves 402 and 404 illustrate, respectively, the power output in decibels relative to 1 milliwatt (dbm) and the change in DC current of a class AB biased power amplification device for use in an ODU of the present invention. As is commonly known in the electrical industry, power amplifiers are classified based on the conduction angle. Class AB bias is described herein as a preferred power amplification device, however, other classes may be equally suited.

Power output curve 402 demonstrates that as the input power to the device is increased, the output power increases linearly until a compression point is reached (e.g., at an input power of approximately 18 dbm on FIG. 4). A rapid decrease in the gain of the device, which is generally defined as the ratio of output power to input power, is experienced after the compression point. In addition, the device no longer behaves linearly to an increase in power input after the compression point.

Current curve 404 is an example which demonstrates the percentage of change in DC current from the zero or starting point. The change in DC current is caused by and is directly related to the amount of clipping of the RF current waveform at the power amplifier FET drain (or at the collector of an equivalent bipolar type power amplifier). In an application using a class AB biased power amplifier, the current waveform at the drain of the FET-based amplifier will clip asymmetrically at the lower side of the waveform. This causes a net positive shift in the RMS current which results in a net positive shift in the DC bias current of the device. The current curve increases monotonically as the input power is increased until a maximum current capability of the device is reached (e.g., at an input power of approximately 18 dbm on FIG. 4). After the maximum current point, the percentage of current change stabilizes and the current curve no longer behaves linearly.

The general shape of curve 404 in the linear region of the amplifier is consistent, but the curve may behave differently in the saturation region. For example, curve 404 is shown to decrease at the inflection point and then begins to increase again; but, at different operating temperatures, the curve may be flat after the inflection point, or may continue to increase but at a substantially reduced slope.

It is generally known that the output power of an amplification device (i.e., the gain) may be affected by temperature variations, and in particular, the P1 db point on the output power curve typically moves as temperature variations occur. As previously mentioned, the present invention determines the P1 db point by taking advantage of the relationship between the P1dB point and the inflection in the DC current curve. Because the current curve is actually measuring the clipping of the amplifier's drain, the point of inflexion moves with the P1 db point. Therefore, even under extreme temperature variations, relying on the P1 db point as the point of inflection of the DC current curve is an accurate and reliable prediction technique.

With continued reference to FIG. 4, the point of inflection of current curve 404 is where the concavity of the curve changes from upward to downward. Determining the point of inflection of the DC current curve may be performed by any suitable method, technique, mathematical calculation, equation, software, algorithm, graphic representation, or the like. Similarly, extrapolating the point of inflection in the DC current curve includes, but is not limited to, comparing the slope of the function curve.

In one exemplary embodiment, the IDU includes a suitable algorithm stored on a processing and memory means. The algorithm may, for example, include appropriate instructions and/or programming for extrapolating the point of inflection in the DC current curve (e.g., as detailed herein), and controlling the level of power input to the ODU. For example, an exemplary algorithm may cause the storage of a plurality of current values received from a current sensor; determine if the point of inflection has been reached; cause the increase of input power to the ODU if the point of inflection has not been reached; and cause the power control system to use an alternate method to strengthen the signal transmission to the satellite if the point of inflection has been reached.

Figure 5:
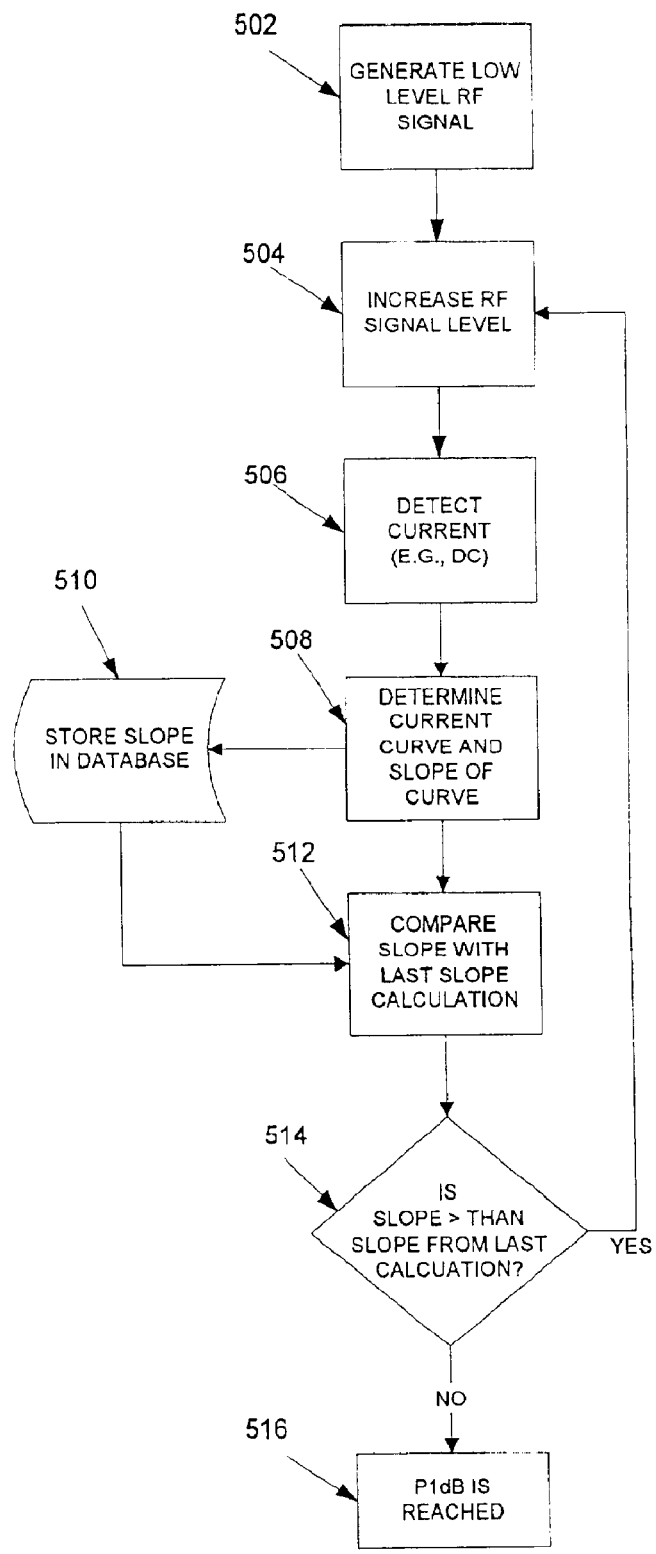
FIG. 5 illustrates an algorithm flow chart for power detection and control in accordance with the present invention.

FIG. 5 is a flow chart illustrating the steps of an exemplary algorithm that may be used with the present invention to determine the P1 db compression point. Any suitable algorithm stored on a processing device may be used in the IDU to control the supply of power to the amplifier (e.g., in the ODU); thus, FIG. 5 and the following description is not intended to be limiting, but rather exemplary of one contemplated method. As previously detailed, it is desirous to limit the power output of an amplification device to the P1 db compression point to minimize adjacent channel interference. By measuring the DC current change of the amplifier, P1 db can be determined and the RF signal power to the amplifier can be controlled accordingly.

FIG. 5 is conveniently described for use in a satellite communication system having a ground station for transmitting and receiving signals between itself and a satellite; however, it should be recognized, that the application is not so limited. The IDU preferably includes a processing means and database for use in controlling the signal supply to the ODU. Initially, the IDU supplies IF and DC signals to the ODU to generate a low level RF signal (step 502). The IDU is then instructed to increase the signal supply to the ODU to generate a higher output RF signal (step 504). In one particular embodiment, the increase may be in a sequential step, e.g., 1 db steps. A current sensor, e.g., current sensor 332 of FIG. 3, located within the IDU detects the DC current supplied to the ODU (step 506). Using two or more current detect Measurements, an appropriate current curve can be plotted and the slope of the curve can be determined (step 508). Determining the slope of a curve can be equated by any suitable formula, equation, derivation, or the like, all of which are widely known and will not be discussed in detailed herein. The slope of the current curve, as just determined, may then be stored in a suitable database for subsequent retrieval (step 510). The previous process (steps 504–510) is then repeated, as needed, to produce two slope values for comparison (step 512). A query follows to determine whether the last slope value is greater than then the most recently stored slope value (step 514). If the last value is greater than the stored value, then the IDU is instructed to increase the signal power to the ODU (step 504) resulting in a higher RF signal output. If the query determines the last value is not greater than the stored value, then the slope of the current curve has ceased to increase and the RF signal power will not be increased, as the P1 db compression point has been reached (step 516).

The following non-limiting example is included to further the understanding of the previous description of FIG. 5. For example, at a given RF signal level A, the detected current may be A'. The percentage of change in current from zero (or reference) to A' can be determined as A" and plotted on a theoretical curve, such as curve 404. At a next RF signal level B, the detected current may be B' and the percentage of change from zero to B' can be determined and plotted as B". The slope of the curve between points A" and B" can then be found and stored as slope value (AB)". At a given RF signal level C, the detected current may be C' and the percentage of change from zero to C' is found to be C". The slope of the curve between points B" and C" can be determined as slope value (BC)". The value of slope (AB)" can then compared with the value of slope (BC)" to determine whether (BC)" is greater than the stored value (AB)". If (BC)" is greater than (AB)", then the current curve (i.e., percentage of current change) is increasing and the RF level may be further increased. If, however, (BC)" is not greater than (AB)", then the current curve is not increasing and the inflection point of the curve has been reached. As previously mentioned, the inflection point of the current curve is an accurate and reliable measurement of the P1 db compression point. At this point, the desired maximum level of RF signal power is reached (to avoid compression) and the IDU may not supply the ODU with increased signals to generate a stronger RF signal.

In the event the P1 db compression point has been reached, the IDU ceases increasing signal strength to the ODU. If, however, the satellite transmits to the ground station that the received RF signal is too weak and a stronger signal is needed, then the IDU may choose to reduce the bit rate of the data transmitted to the satellite (through use of error correction coding, reduced bandwidth transmission, or other suitable means). As previously mentioned, a suitable algorithm may be employed to determine if the P1 db point has been reached and instruct the IDU to use an alternate method to strengthen signal transmission to the satellite.

It should be appreciated that the particular implementations shown and described herein are illustrative of various embodiments of the invention including its best mode, and are not intended to limit the scope of the present invention in any way. For instance, while conveniently described in connection with a satellite communication system, various other applications may benefit as well. Generally, various other systems where power detection and control is needed may be well suited for the present invention, for example, microwave communication systems, such as, in a cellular base station.

In addition, for the sake of brevity, conventional techniques for signal processing, data transmission, signaling, and network control, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

The present invention has been described above with reference to exemplary embodiments. However, those skilled in the art having read this disclosure will recognize that changes and modifications may be made to the embodiments without departing from the scope of the present invention. These and other changes or modifications are intended to be included within the scope of the present invention, as expressed in the following claims.

What is claimed is:

1. A satellite ground station system, said system in signal communication with a satellite, said system comprising:
    a signal control unit configured to modulate a transmission signal to said satellite in accordance with a theoretical P1 db point of said system, said P1 db point in correlation with power supplied to a transceiver, wherein said power does not include RF power;
    an antenna unit configured to receive a communication from said satellite and to transmit said transmission signal to said satellite; and
    a means for two-way signal communication between said control unit and said antenna unit.

2. A satellite ground station system of the type capable of receiving and transmitting RF signals to a satellite, a transmitted RF signal having a transmission power level as determined by a signal control unit of said system, said signal control unit configured to measure the power supplied to a transceiver and to vary the power level of said transmitted RF signal based on said measured power such that a maximum transmitted RF power level is determined based on said measured power, wherein said measured power does not include RF power.

3. An uplink power control system for a satellite communication station, said system transceiving RF signals with a satellite, said power control system comprising:
    a control unit having a modem and a supplied power sensing mechanism, said modem providing a signal for transmission to said satellite in accordance with said supplied power sensing mechanism, wherein the supplied power does not include RF power;
    an antenna unit having an antenna for receiving said RF signal from said satellite and transmitting an RF signal to said satellite, said transmitted RF signal in accordance with said signal for transmission received from said modem of said control unit; and
    a signal transfer means between said control unit and said antenna unit.

4. The power control system of claim 3 wherein said supplied power sensing mechanism comprises a dc current sensor in electrical communication with an RF power control device.

5. The power control system of claim 3 wherein said supplied power sensing mechanism senses the dc current provided to said antenna unit and comprises a means for determining a compression point of said system.

6. The power control system of claim 5 wherein said means for determining a compression point comprises determining the change in dc current provided to said antenna unit.

7. The power control system of claim 3 wherein said signal transfer means comprises a cable.

8. A method for signal control in a satellite ground station, said station of the type for transmitting and receiving signals between a satellite, said method comprising:
    receiving, at a transceiver unit of said station, a signal for satellite transmission from a control unit of said station;
    detecting, at said control unit, the power supplied to said transceiver unit in the presence of said signal for satellite transmission, wherein the detected power supplied to said transceiver unit does not include RF power;
    determining a desired maximum signal power level of said signal based on said detecting step;
    modulating said signal in accordance with said desired maximum signal power level; and
    transmitting said modulated signal from said transceiver unit to said satellite.

9. The method of claim 8 wherein said determining step comprises determining a P1 db compression point.

10. The method of claim 9 wherein said determining step further comprises determining an inflection point in a theoretical current curve comprising a plurality of current points.

11. The method of claim 8 wherein said determining step comprises exploiting a relationship of said desired maximum signal power level from a plurality of current points from said detecting step.

12. The method of claim 8 wherein said determining step comprises determining a slope of a theoretical current curve comprising a plurality of current points from said detecting step.

13. A computer program embodying instructions executable by a processing means to perform method steps for determining a compression point in an uplink power control system, the system including a control unit and an antenna unit configured to communicate with each other over a communication channel, said method steps comprising:
    generating a signal in said control unit to produce a low level RF signal in said antenna unit;
    increasing said signal strength in said control unit to produce a higher level RF signal in said antenna unit;
    detecting, in said control unit, a current level in said signal;
    determining, in said control unit, a first slope of a theoretical current curve created from at least two detected current levels;
    determining, in said control unit, a second slope of said theoretical current curve;
    comparing said first and second slopes to determine whether said second slope is greater than said first slope; and
    repeating the method steps until said comparing step determines said second slope is not greater than said first slope.

14. A method for determining a P1 db compression point of a power control system, said system having a control unit in communication with an antenna unit, said method comprising the steps of:
    providing a signal to said antenna unit, said signal comprising a signal power level;
    detecting a dc current level of said signal;
    analyzing a change of said current level, said change corresponding to a difference between a reference point and said detected dc current level;
    increasing said signal power level and repeating the above steps; and
    determining an inflection point in said change of said current level, said inflection point corresponding to said P1 db compression point.

15. The method of claim 14 wherein said analyzing comprises a theoretical graphing of a plurality of points, said plurality of points corresponding to a plurality of detected current levels.

16. The method of claim 14 wherein said determining comprises calculating a slope from a curve of said change of said current level.

* * * * *